(12) United States Patent  
Salazar (10) Patent No.: US 9,415,825 B1  
(45) Date of Patent: Aug. 16, 2016

(54) COMBINATION BICYCLE HANDLEBAR AND STEM ASSEMBLY

(71) Applicant: Nicholas M Salazar, Littleton, CO (US)

(72) Inventor: Nicholas M Salazar, Littleton, CO (US)

(\*) Notice: Subject to any disclaimer, the term of this patent is extended or adjusted under 35 U.S.C. 154(b) by 0 days.

(21) Appl. No.: 14/674,712

(22) Filed: Mar. 31, 2015

(51) Int. Cl.  
*B62K 21/12* (2006.01)

(52) U.S. Cl.  
CPC .................................... *B62K 21/125* (2013.01)

(58) Field of Classification Search  
CPC ....... B62K 21/12; B62K 21/125; B62K 21/18  
See application file for complete search history.

(56) References Cited

U.S. PATENT DOCUMENTS

| | | | | |
|---|---|---|---|---|
| 7,698,967 | B2* | 4/2010 | Ording | B62K 21/12 74/551.1 |
| 7,837,212 | B2* | 11/2010 | D'Aluisio | B60T 7/10 280/279 |
| 8,172,247 | B2* | 5/2012 | Weber | B62K 21/125 280/278 |
| 2005/0109150 | A1* | 5/2005 | Chiang | B62K 21/12 74/551.1 |
| 2007/0151403 | A1* | 7/2007 | Andrews | B62K 21/12 74/551.1 |
| 2008/0168857 | A1* | 7/2008 | Chiang | B62K 21/12 74/551.1 |
| 2012/0297922 | A1* | 11/2012 | Cote | B62K 21/125 74/551.3 |
| 2013/0240313 | A1* | 9/2013 | Moore | B60T 11/16 188/344 |
| 2013/0263689 | A1* | 10/2013 | Robinson | G05G 1/12 74/548 |

\* cited by examiner

*Primary Examiner* — Vicky Johnson  
(74) *Attorney, Agent, or Firm* — Leyendecker & Lemire, LLC (57) ABSTRACT

A combination triathlon aero handlebar and stem assembly or handlebar assembly incorporating several innovations is described. Clamp bolt sections for securing the extension bars are located behind a streamlined spacer to reduce frontal area. The design of the extension bar clamps permit tightening and loosening from above through the elbow rest platforms without the removal of the platforms. Streamlined height spacers used to adjust the height of the extension bars include a groove along their trailing edges in which a wire from a electronic shifter can be received. The stem portion of the includes an internal cavity in which the junction box of a electronic shifting system can be received. The streamlined stem height spacers include a path to receive and pass the front brake cable and housing therethrough and include slots that permit the removal and installation of a spacer without disconnecting and unthreading the brake cable.

20 Claims, 10 Drawing Sheets

COMBINATION BICYCLE HANDLEBAR AND STEM ASSEMBLY

BACKGROUND

Combination triathlon aero handlebar and stem assemblies (referred to herein as "handlebar assemblies") are known and typically comprise a unitary main body, often advantageously fabricated from a carbon fiber composite, and including a stem portion, right and left airfoil portions extending outwardly of the stem and left and right handle portions situated at the ends of the respective airfoil portions. A pair of relatively closely spaced tubular extensions extends forwardly from the body on either side of the stem portion. The extensions are mounted to the body by way of an extension mount assembly that includes a circular clamp to secure the extensions in place. The extension mount assembly also typically includes elongated fasteners and vertical extension spacers through which the entire assembly is secured to the body with the circular clamp located a desired distance above the body. On top of the extension mount assembly, an elbow rest platform is provided that is typically secured to the extension mount assembly through fasteners. Resilient cushioned pads may be provided to rest on the top of the elbow platform.

The stem portion mounts to a portion of an associated bicycle's fork steerer tube that extends upwardly from the frame of the bike to which it is rotatably secured. Airfoil Stem height spacers are used between a bicycle head tube and the bottom of the stem portion to set the height of the rest of the handlebar assembly. These spacers may have a round cross-section or an airfoil-shaped cross-section.

Traditionally, triathlon handlebar assemblies are designed to both be as aerodynamic as possible as well as facilitate a rider of the associated bicycle to don the most aerodynamic position as is possible while riding. Maximizing aerodynamic efficiency involves (1) minimizing frontal area, and (2) streamlining to reduce drag inducing air flow. To do this the vertical extension spacers, the stem height spacers and the airfoil portions of the body are given streamlined aerodynamic shapes. Further, means are provided for internally routing wires and cables associated with shifters and brake levers that are usually secured to the handlebar assembly. By internally routing the wires and cables, their effect on airflow is eliminated.

In prior art assemblies, it is known to route the wires inside of the extension spacers, which are typically at least partially hollow. This achieves a similar result concerning aerodynamics but makes adjusting the height of the extension spacer stack more difficult and time consuming. Specifically, to add or remove spacers to raise or lower the extension bars, the shifter wires have to be unthreaded to allow a spacer to be removed or to thread the wire through a new spacer that is being added. This can be frustrating especially if the user has to unthread and thread the wires multiple times until he or she settles on the proper extension bar height.

Other prior art assemblies route the shifter wires external to the extension spacers, but either allow the wires to be exposed to the wind, or may attempt to hide them via additional pieces that are secured to the assembly via additional fasteners. These additional pieces present the same problem as above, which is that any adjustment is made unnecessarily difficult by the need to deal with additional parts.

Because of the aerodynamic design, and as indicated above, the stem spacers are aerodynamically shaped, which means they extend forwardly often a couple of inches beyond the front edge of the steerer tube. Because the cable and housing for the front brake is typically fed through the stem portion, the cable must pass through an interior bore of the spacers exiting from the bottommost spacer as it continues its path to the front brake caliper. Using prior art spacers in prior art handlebar assemblies the rider must unthread the brake cable from the caliper and from the spacers' bores before removing or adding spacers to adjust the stem height. If the rider desires to ride the bicycle after each height change to ascertain to his or her satisfaction that the optimal height has been achieved he or she must unthread the cable prior to each change and then rethread the cable before each test ride. This increases the time in making an adjustment and can prove frustrating especially since the brake calipers and the spacing of its shoes from the rim may need to be adjusted each time.

Electronic shifting systems like Di2 by Shimano include control boxes or junction boxes in which the wires from the derailleurs, the battery pack and the shifters meet and communicate. Typically, the control box is attached to the bottom side of a stem. As can be appreciated, mounting the box in this position potentially increases frontal area and as a result aerodynamic drag. Furthermore, the under the stem attachment means is often clunky and unrefined.

DETAILED DESCRIPTION

At least one embodiment of the present invention comprises a combination triathlon aero handlebar and stem assembly or handlebar assembly. Another embodiment of the invention comprises a stem assembly that can be used any desired bar that is appropriately sized to be received in the provided bar clamp.

Embodiments of the handlebar assembly incorporate several significant innovations that improve not only the aerodynamics and functionality over prior art handlebar assemblies, but also make set up and adjustment of the assembly more convenient. In at least one embodiment, the bolt and associated bores in the circular clamp of the extension mount that are necessary to secure extensions to the handlebar assembly are located immediately behind the associated spacer portion thereof. By doing this the bolt portion of the clamp does not create any additional frontal area thereby increasing aerodynamic efficiency over prior art handlebar assemblies.

In at least another embodiment, the extension spacers include a slot along their exterior trailing edges in which a wire of a predetermined size can be retainably received. By placing the wire, such as one that extends between a shifter button and a control box of an electronic shifting system, any drag potentially caused by the wire is eliminated. To add or remove spacers, the wires need only be pulled out of the slots at the trailing ends of the spacers permitting a user to add or remove spacers without unthreading and rethreading the wires saving time and potential aggravation.

In some embodiments of both the stem and the handlebar assembly, each stem spacer includes a first slot that extends from the bore rearwardly terminating at the steerer tube bore. A shorter second slot extends from the bore to the trailing edge of the spacer. The slots are typically at least the width of a brake cable housing. The incorporation of these slots into the stem spacers facilitates easy removal of the spacer and easy insertion of additional spacers without the need to disconnect the front brake and its cable and housing.

Further, embodiments of the handlebar assembly include a cavity within the stem portion's extension sized to receive and retain an electronic shifting system control box therein. Specifically, the cavity is at least 25 mm wide by 20 mm deep by 50 mm long. In some variations the cavity faces upwardly and is accessed by removing a cover off the top of the stem extension.

TERMINOLOGY

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

The terms "streamlined" and "airfoil" as used herein refer to the general shape of the components/elements to which they refer. They reference a general shape that is designed or configured to move smoothly through the air and cause reduced drag over similar components/elements that are not so shaped.

An Embodiment of a Handlebar Assembly

FIGS. 1-9 illustrate an embodiment of a handlebar assembly 10 and components thereof. The primary components and subassemblies of the assembly include (i) a unitary main body 12, (ii) left and right stacked vertical spacers 14 & 16, (iii) left and right top spacers 18 & 20, (iv) tubular left and right extension bars 22 & 24, (v) an elbow rest subassembly 26, and (vi) stacked stem height spacers 28. Additional components include covers, hole plugs and various fasteners necessary to join the components of the assembly together.

Figure 1:
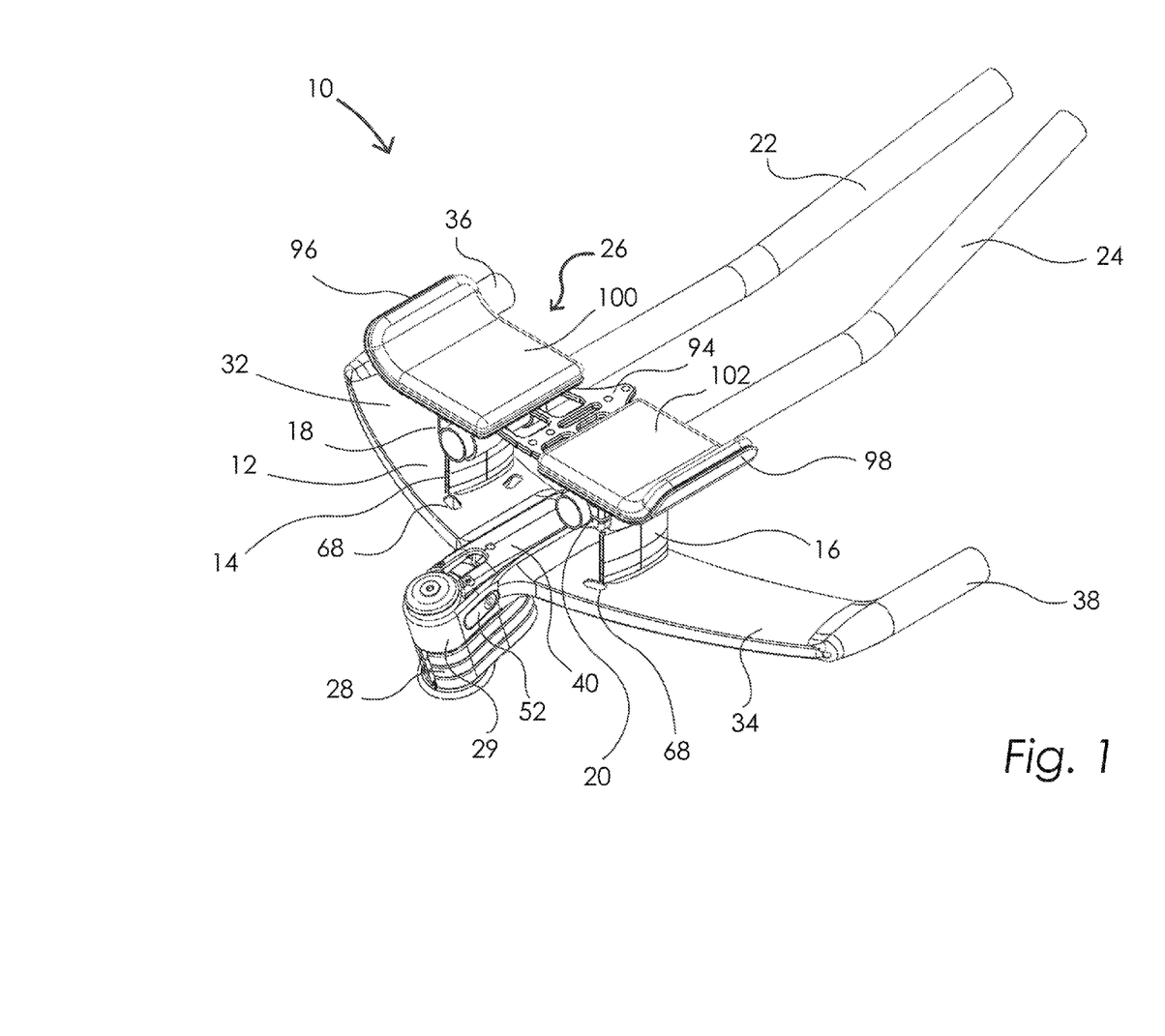
FIG. 1 is an isometric view of a handlebar assembly according to one embodiment of the present invention.
Figure 2:
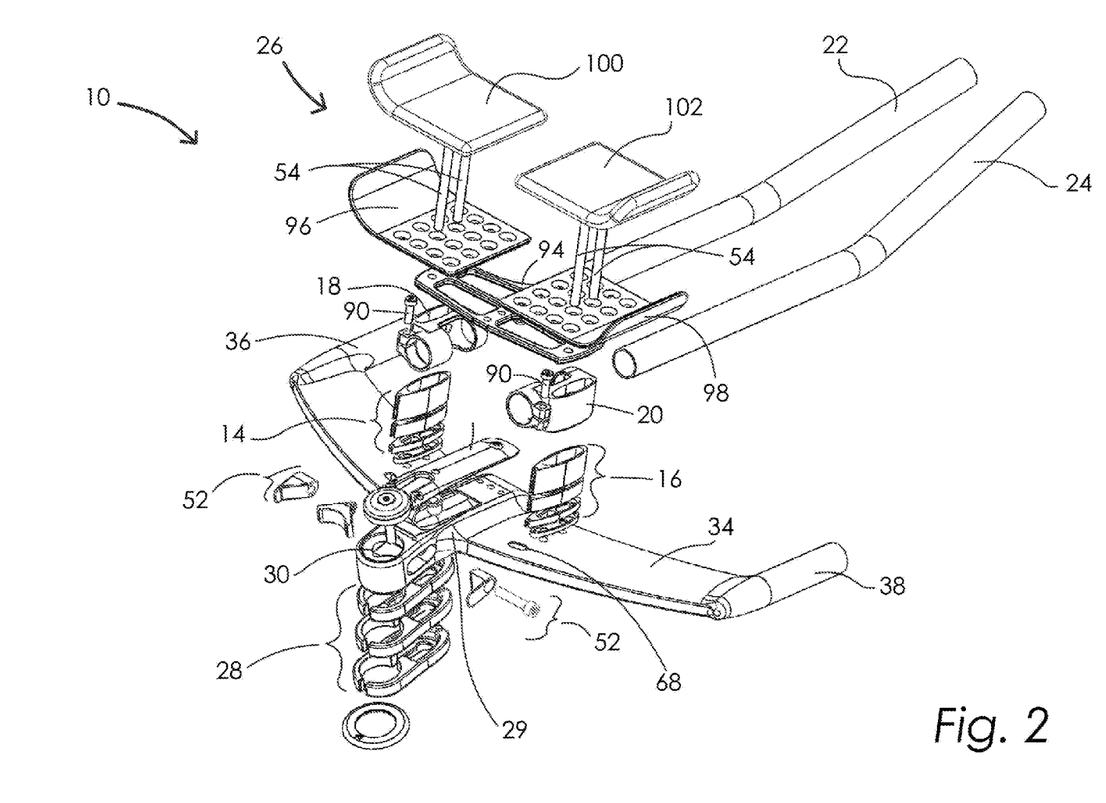
FIG. 2 is an exploded isometric view of the handlebar assembly according to the embodiment of the present invention.

The unitary main body 12 is best shown in FIGS. 1 & 2. It is typically fabricated of a unitarily mold carbon fiber and resin composite and comprises several distinct portions. A stem portion 29 extends from a steerer tube bore 30 wherein the steerer tube of a bicycle's fork is received and secured and extends forwardly therefrom. From the left and right sides of the stem portion integrally molded respective left and right airfoil portions 32 & 34 extend outwardly terminating in integrally molded respective left and right handholds 36 & 38. The interior of the body portion is substantially hollow with access holes placed in the body at strategic locations permitting cables and wires associated with shifters and/or brake actuators to be routed therein.

Figure 8:
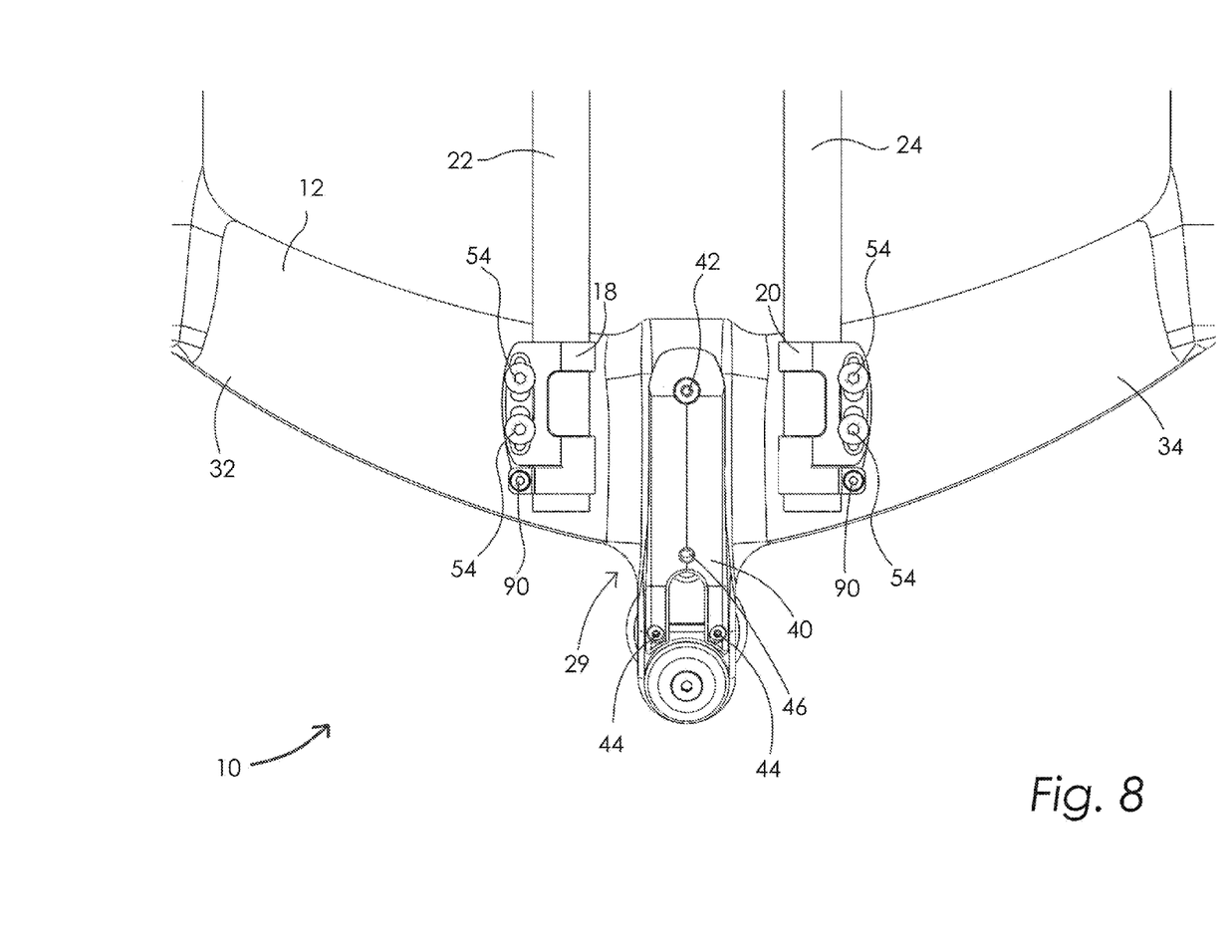
FIG. 8 is a partial isometric top view of the handlebar assembly with the elbow pads, pad supports and supporting brace removed according to the embodiment of the present invention.

A stem cover 40 is provided for attachment over the top of the stem portion 29 as best illustrated in FIG. 8. The cover is typically fabricated from a carbon fiber composite but can be molded from plastic or metal as well. As shown the cover is secured to the stem by way of three threaded fasteners holes: a front cover hole 42 near the front of the stem and two rear cover holes 44 proximate the steerer tube bore 30. A water bottle cage mounting hole 46 is provided inline with the front cover hole 42 of the front fastener hole and spaced rearwardly therefrom essentially 63 mm permitting a water bottle cage with industry standard spacing to be mounted thereon using appropriate fasteners.

Figure 9:
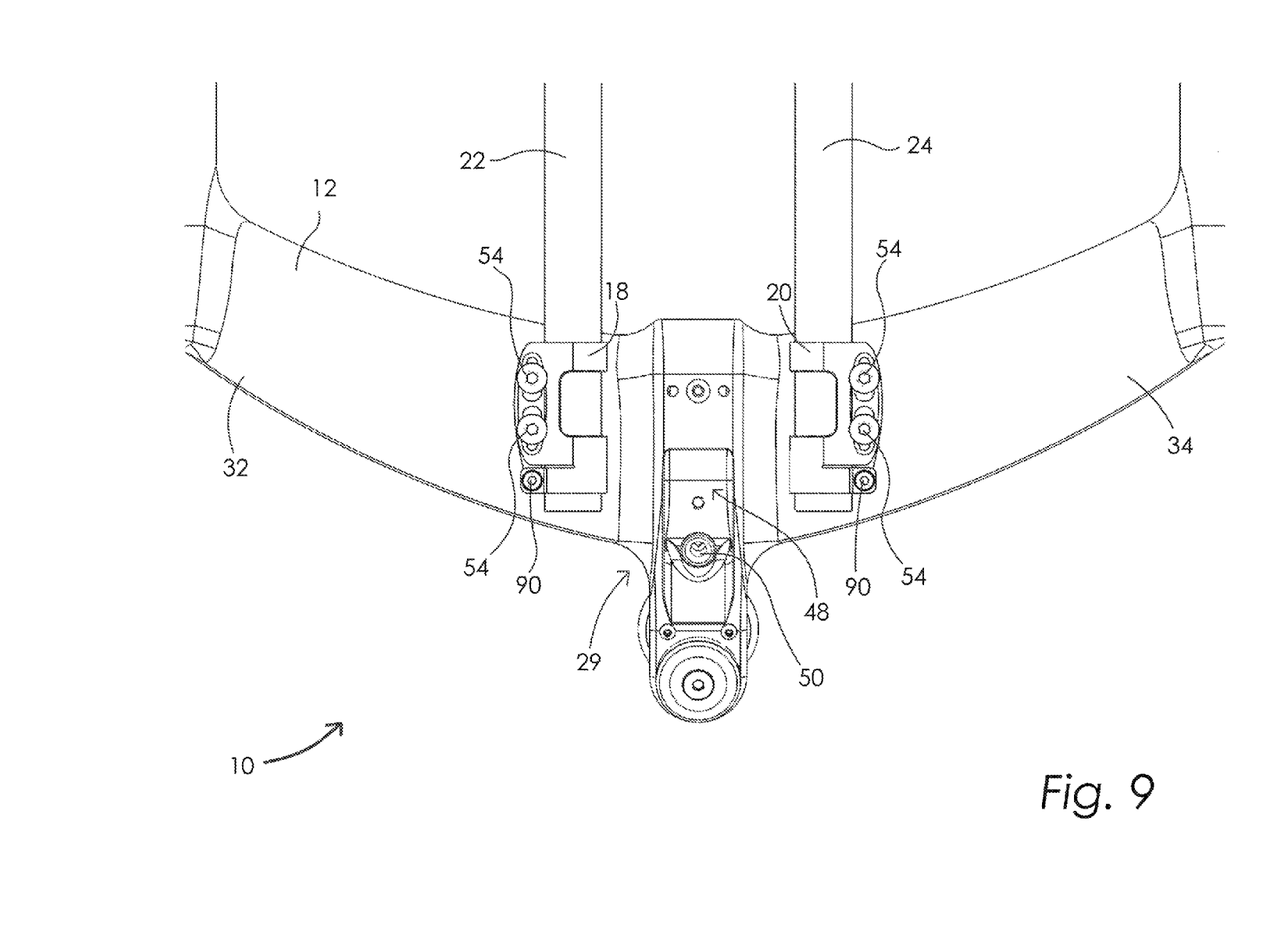
FIG. 9 is a partial isometric top view of the handlebar assembly with the elbow pads, pad supports, supporting brace and stem cover removed according to the embodiment of the present invention.

Referring to FIG. 9, the step portion 29 is shown from above with the stem cover 40 removed and revealing a cavity 48 therein. The forward portion of the cavity in front of a brake cable bore 50 is at least 25 mm wide×20 mm deep×50 mm long in size providing ample room for a electronic shifting control box, such as the front junction box for a Shimano Di2 system. The cable bore is sized to receive either or both a brake cable or cable housing therethrough as it exits from the interior of the bar and extends downwardly to the front brake caliper of the associated bicycle.

To secure the body portion to the fork steerer at the steerer tube bore 30 a wedge clamp assembly 52 is provided as best shown in the exploded view of FIG. 2. When the clamp is tightened around and against the steerer tube, the stem portion 29 is frictionally engaged and held firmly in place on the steerer tube. At various strategic locations of the body portion, metal threaded inserts are provided as necessary to receive and hold threaded fasteners. In variations, the inserts can be molded in situ during the body portion's fabrication or they can be attached to the body portion after fabrication. Other holes and openings are also distributed in various places along the body to provide a user with various options concerning the routing of cable and wires often through the interior of the body and out of the body.

Referring again to FIG. 1 a plurality of respective left and right stacked vertical spacers 14 & 16 are provided rising up from the top surface the left and right airfoil portions 32 & 34 of the main body 12. Fasteners 54 are used to secure the stack in place as can be seen, for instance, in FIG. 9. The stack along with associated left and right top spacers 18 & 20 with associated clamp portions 56 are provided to set the distance of the tubular extensions 58 above the main body a distance determined by a rider to be most effective for his/her riding style. More extensions can be stacked to raise the extensions higher or fewer utilized when a lower height is desired.

Figures 3A, 3B:
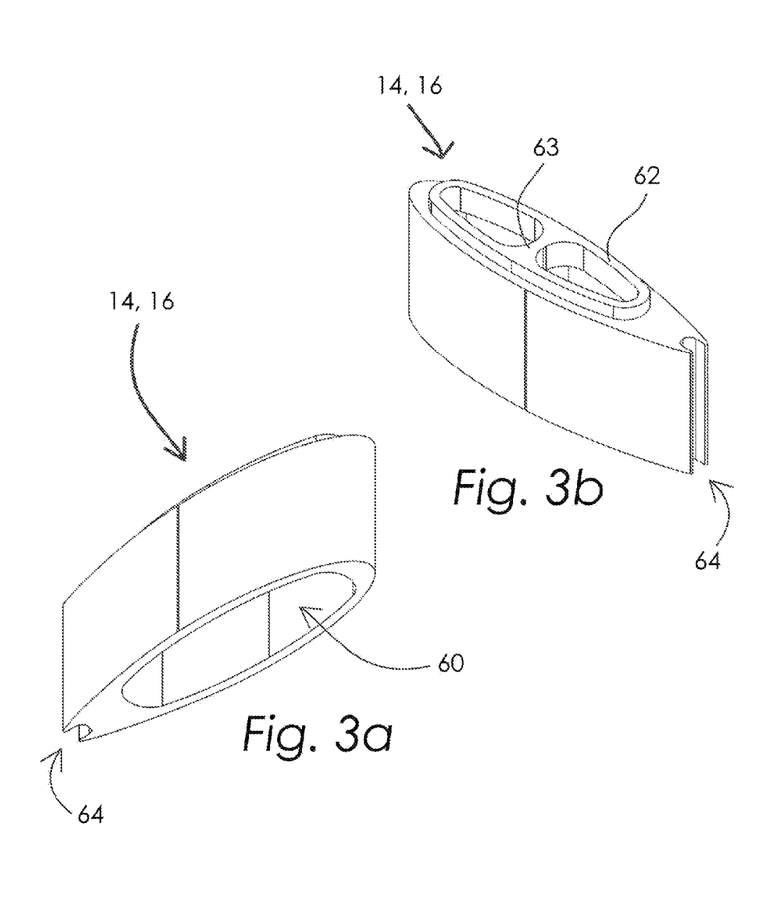
FIGS. 3a-c are various views of a vertical spacer according to the embodiment of the present invention FIGS. 4-a-b are isometric top and bottom views of the stem height spacer according to the embodiment of the present invention.
Figure 3C:
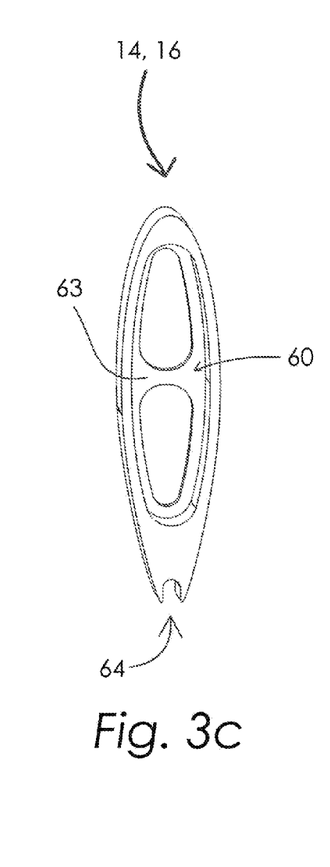

Three views of a typical spacer 14, 16 are shown in FIGS. 3A-C. The spacers have a generally streamlined airfoil shape to minimize frontal area and aerodynamic drag. Spacers of different heights can be provided typically from 5 mm to 50 mm and are configured to be stacked to permit a rider to create a spacer stack of a desired height above the body 12. The top of the spacer is best shown in FIGS. 3A & 3C. It is essentially flat with a generally ovular interior opening 60 that extends substantially through to the top end of the spacer.

The bottom of the spacer is best shown in FIG. 3B. The bottom is characterized as flat with a protruding ridge 62 that extends outwardly from and generally encircles the ovular opening. As shown, a reinforcing web 63 that spans the opening comprises part of the protruding ridge and generally bisects the ovular opening. The protruding ridge is sized to be snuggly received in the ovular opening in the top side of an adjacent spacer or for the bottommost spacer in a depression provided on the top surface of the main body 12.

Of significance on each of the spacers 14, 16 is a vertically extending groove 64 along the trailing edge of the spacer. The groove is sized to tightly but removably receive a wire from an electronic shifter therein. Traditionally, wires from electronic shifters secured to the ends of the tubular extensions 22, 24 are routed through the bar and then into the interior of the spacers wherein they are then routed into the body 12 of the assembly. While very clean, the traditional solution suffers from the setback described above in the background section. Alternatively, these wires have traditionally also been routed outside of the extension spacers, which exposes them to the wind.

With the trailing edge groove 64, a shifter wire is routed through the tubular extension, out the tail end of the extension perhaps through an opening in an end cap (not shown), over to the topmost spacer 18, 20 of the stack located just below the top spacer 22, 24 into the groove at a top edge thereof, down through the grooves of all stacked spacers for the particular left or right stack, exiting the groove at the bottom edge of the bottommost spacer 14, 16 and into the interior of the main body through an opening 68 provided proximate the mounting location of the respective spacer stack. The shifter wire this then routed to a junction/control box housed in the cavity 48 provided in the stem portion 29. Advantageously, the vertical trailing edge grooves 64 permit the clean routing of the shifter wires and permit a spacer to be added or removed out without having to first thread or unthread the shifter wire through to the interior of the spacer.

Figure 5A:
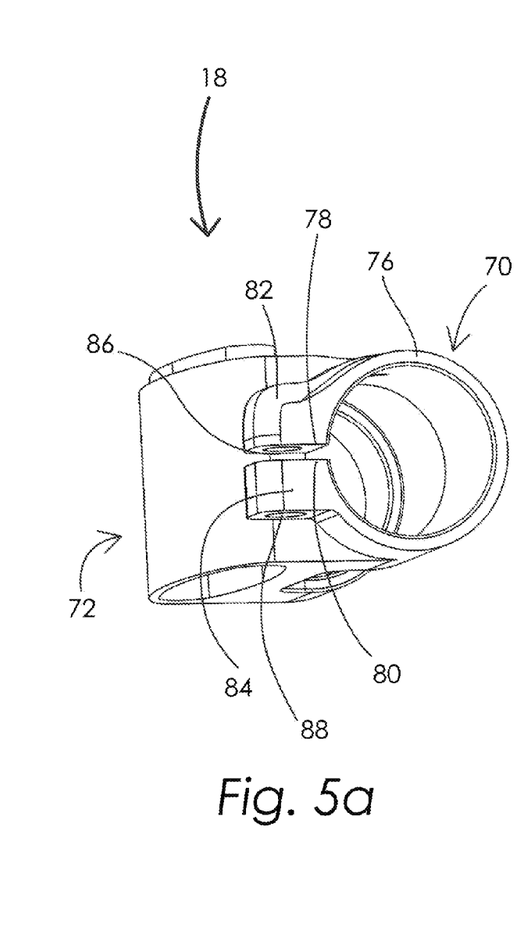
FIGS. 5a-b are isometric views of the top spacer including clamp portion according to the embodiment of the present invention.
Figure 5B:
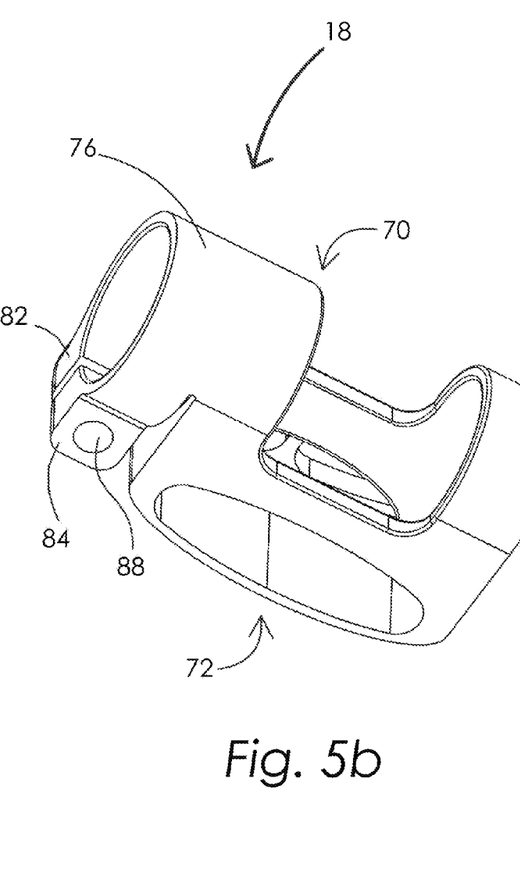

The top of either the left or right spacer stack comprises a top spacer 18, 20, which differs from the left and right stacked vertical spacers 14, 16 in the addition of a clamping portion 70 through which the end of the extension bars 22, 24 are received and secured to the assembly. A typical right top spacer 18 is shown in FIGS. 5a&b. The right top spacer is a minor image of the left top spacer.

In the left spacer, the clamp portion 70 extends outwardly from the right side of an airfoil spacer portion 72. The clamp portion includes a front clamp band 74 and a rear clamp band 76. The front clamp band is continuous and does not provide an active clamping mechanism but acts to cradle and support the tube therein. The rear clamp band is discontinuous with the band terminating at facing top and bottom clamp ends 78 & 80. Protruding from the clamp ends are bolt bosses 82 & 84 each having a vertically extending bolt bore 86 & 88 aligned with the other bolt bore. A securing bolt 90 (see FIG. 8) is received through the top bore 82 and secured in the threaded bottom bore 84 wherein tightening the bolt pulls the top clamp end towards the bottom clamp end and applies a constraining force on the portion of the extension bar received therein.

Of particular note is the relative location of the bosses 82 & 84 and consequently the associated securing bolt 90 substantially directly behind the tailing edge of the spacer portion 72. Effectively, the bosses and the bolt do not contribute or add to the frontal area of the handlebar assembly making the assembly potentially more aerodynamic than prior art assemblies wherein the clamp bosses are located in the air stream and increase frontal area.

Referring again to FIGS. 1 & 2, elbow rest subassembly 26 is typically secured to the top of the top spacers 18 & 20 by way of the elongated fasteners 54 that extend through the interior of each spacer stack and are threadably secured to threaded inserts within the main body 12. The elbow rest subassembly comprises: (i) a stiffening brace 94; (ii) left and right elbow pad platforms 96 & 98; and (iii) elbow pads 100 & 102. The elbow pads are comprised of an elastomer and/or foam material but the remainder of the subassembly components are comprised of rigid high strength materials, such as but not limited to aluminum alloys and carbon fiber composites.

Figure 7:
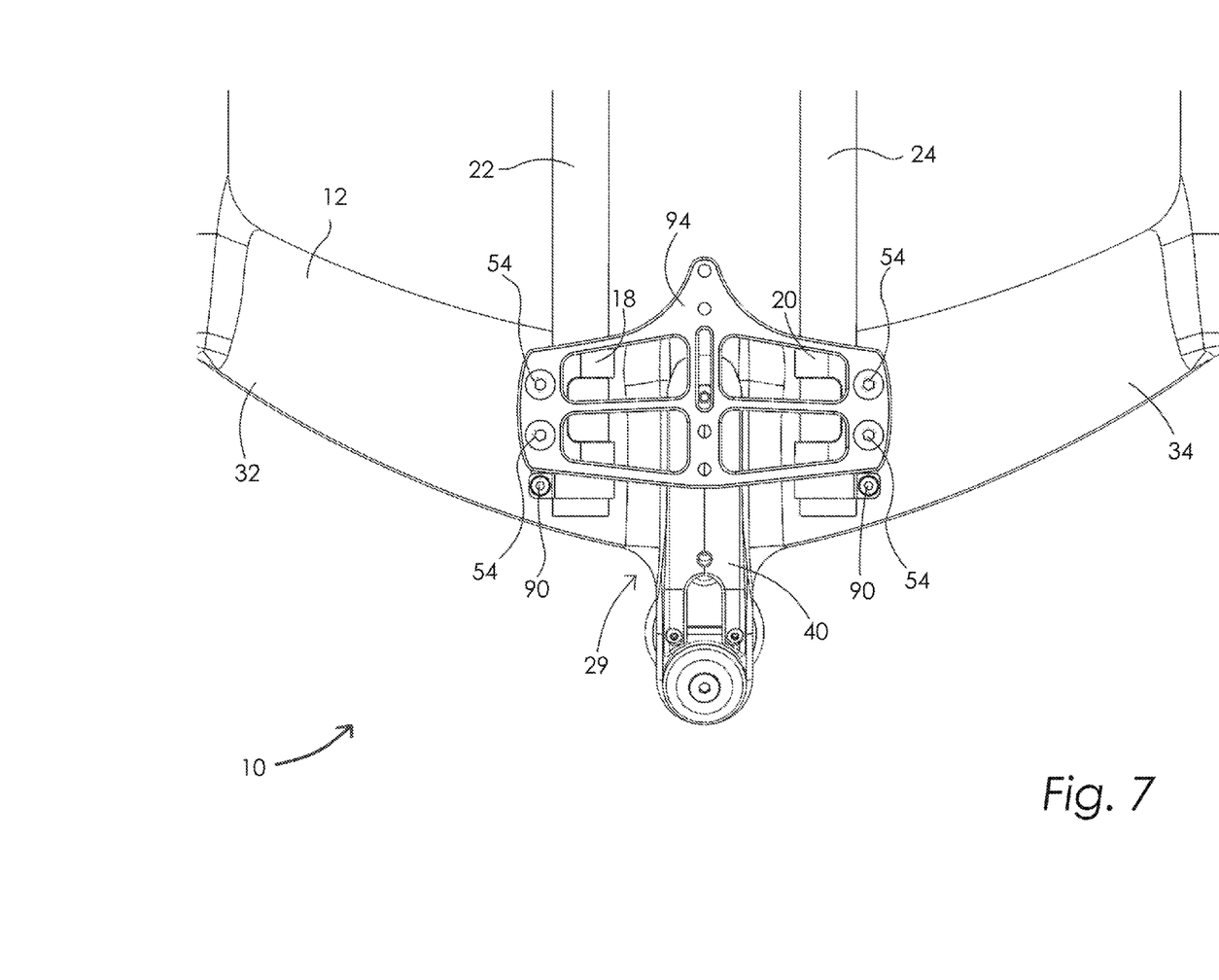
FIG. 7 is a partial isometric top view of the handlebar assembly with the elbow pads and pad supports removed according to the embodiment of the present invention.

The stiffening brace 94 as the name suggests acts to stiffen and rigidify the elbow rest subassembly along with the extension bars therebeneath by structurally tying together the left and right extensions and the associated left and right spacer stacks. The stiffener brace is secured to the underlying spacer stacks by the same elongated fasteners 54 used to secure the spacer stacks to the main body wherein the bolts are passed through fasteners holes provided in the stack as best seen in FIG. 7. The stiffening brace 94 also includes two pairs of M5 bolts (not marked) spaced 63 mm apart to receive a water bottle cage of industry-standard size. The existence of two pairs allows the user to adjust the fore-aft position of the bottle cage.

Figure 6:
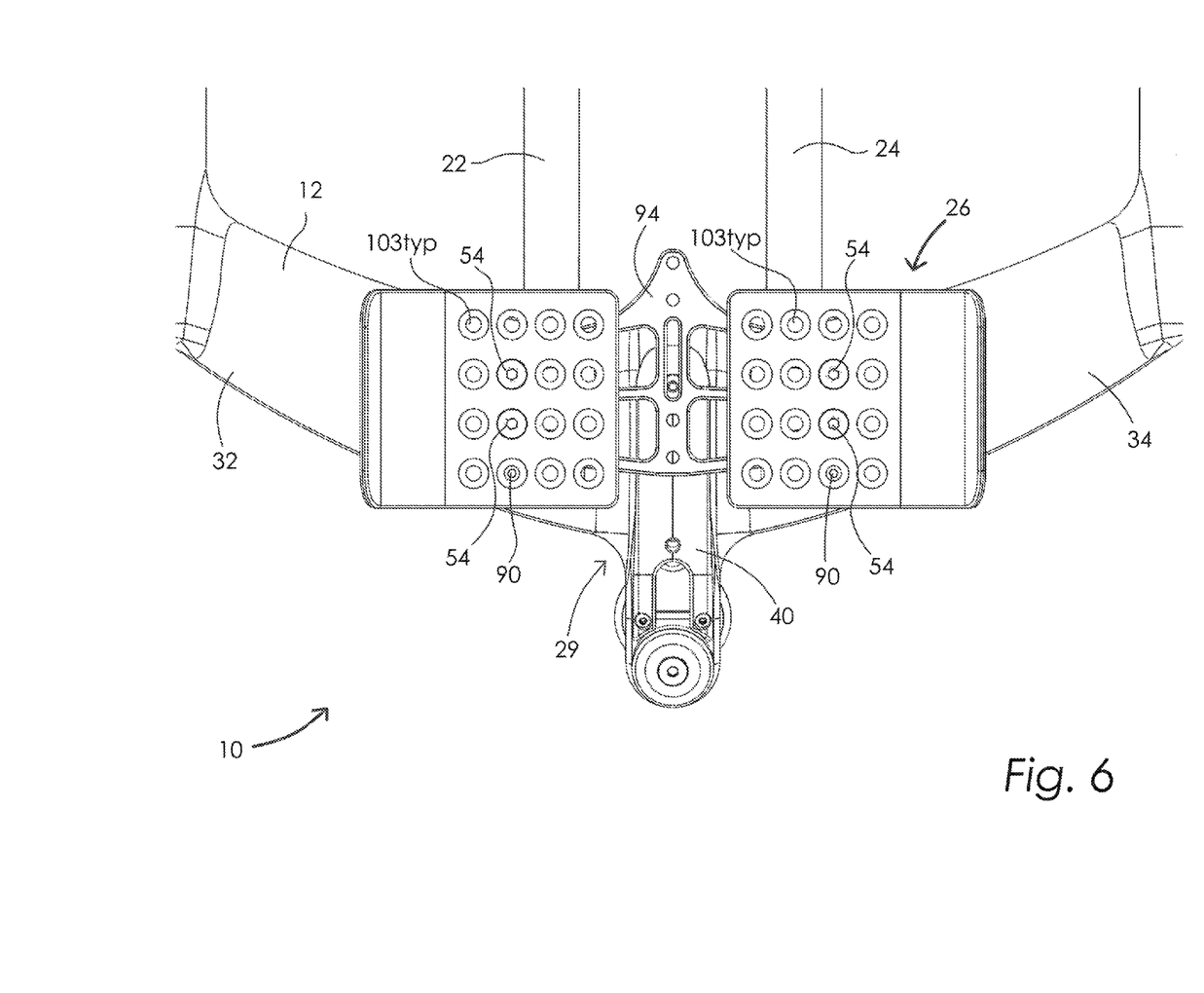
FIG. 6 is a partial isometric top view of the handlebar assembly according to the embodiment of the present invention.

Elbow pad platforms 96 & 98 are mounted over the brace 94. They include an array of fastener holes 103 that give the user great flexibility in the positioning of the platforms. The same elongated fasteners 54 that secure the brace and the spacer stacks to the body are used to secure the elbow pad platforms to the brace by passing the applicable bolts through the desired pair of holes on each platform as best seen in FIG. 6.

Referring to FIG. 8, it can be seen that the elongated bolts for each side when installed are in line with the clamp portion securing bolt 90 of the same side. Also of significance is that the spacing between the two elongated fasteners 54 is the same as the spacing between the rearmost elongated bolt and the securing bolt 90. This spacing is also the same spacing of the fastener holes 103 in the respective elbow pad platforms 96 & 98. As a result of this arrangement, no matter the position the elbow pad platforms are secured to the stiffening brace 94, access to the heads of the respective clamp portion securing bolts are visible and accessible to the user. Advantageously, the user can using the appropriate tool loosen and tighten the securing bolts from above to adjust the positioning of the extension bars 22 & 24 without having to remove the elbow pad mounting platforms.

As desired, the elastomeric and/or foam elbow pads 100 & 102 are placed on and over the elbow pad platforms and are typically secured thereto with adhesive or hook and loop patches provided on both the bottom surfaces of the pads and the top surfaces of the platforms.

Figure 4A:
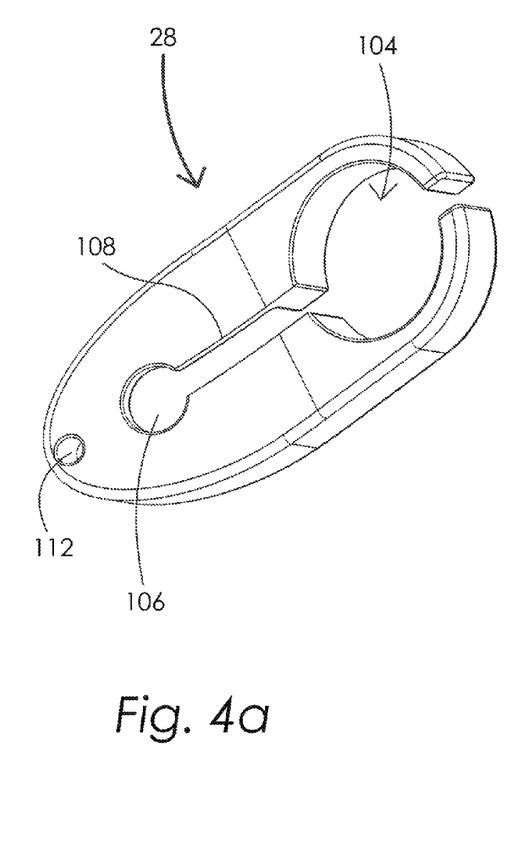
Figure 4B:
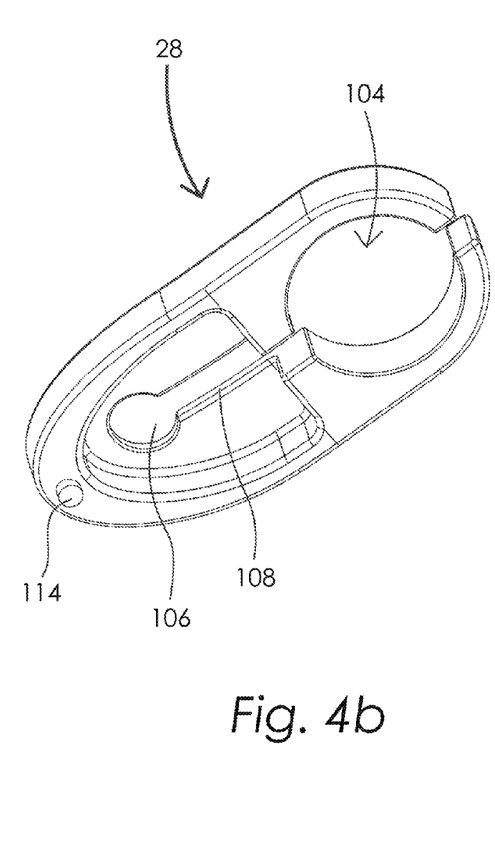

Referring back to FIG. 1, a stack of stem height spacers 28 are provided to adjust the relative height of the handlebar assembly above the headtube of an associated bicycle. Isometric views of a typical spacer are shown in FIGS. 4a&b. To maximize the aerodynamic efficiency of the assembly these spacers are elongated and have a streamlined shape that extends about a couple of inches in front of the steerer tube bore and the associated bores 104 in the spacers. A small nubbin 114 extends upwardly from the front of the spacer and is received in a similarly size cavity 112 on the bottom side of an adjacent spacer. A similar cavity (not shown) is provided on the bottom side of the stem portion 29 of the main body to receive the nubbin of the topmost spacer in the stack. The nubbins and associated cavities in concert with the steerer bores 104 keep the spacers properly aligned when the assembly is installed on a bicycle.

As discussed in relation to the stem portion 29, a front brake cable is typically routed through the cable bore 50 in the stem portion and out of its bottom side towards the front brake caliper. The same brake cable most pass through the interior of the stem height spacers, and to facilitate this, an opening 106 is provided in each spacer. To facilitate the ability to add and remove spacers without having to detach and unthread the front brake cable a slot 108 is provided. The slot 108 having a width greater than a typical brake cable housing and extends from the brake cable opening 106 to an exterior edge of the spacer. In the illustrated spacer, the slot extends across the steerer tube bore 104. Advantageously, by passing the installed brake cable and housing through the slots, a spacer can be added or removed without or disconnecting the brake cable.

An Embodiment of a Bicycle Stem

Figure 10:
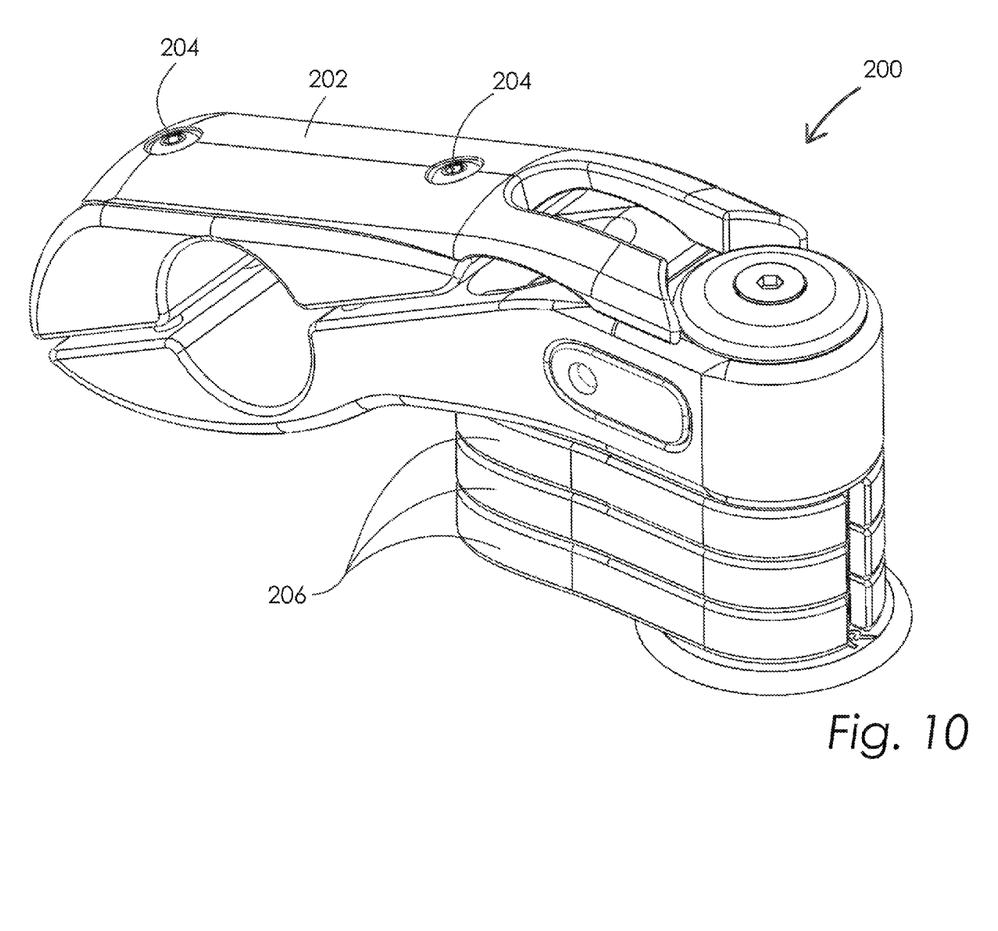
FIG. 10 is an isometric side view of a stem assembly according to another embodiment of the present invention.

An embodiment of a bicycle stem assembly 200 is illustrated in FIG. 10. Generally, the stem shares several of the features of the stem portion 29 of the handlebar assembly 10. It has a similar attachment means. It includes a cover having holes 204 spaced thereon that permits the attachment of a water bottle cage thereto. It includes a bore (not shown) to permit a brake cable housing to pass therethrough. It also utilizes substantially similar stem height spacers 206 having essentially the same features as the spacers 28 described above in relation to FIGS. 4a&b.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention. For instance, the exact design and configuration of the apparatus can vary dramatically from the illustrated embodiment utilizing different materials and mechanisms as best adapted for the materials and construction of the apparatus.

I claim:

1. A handlebar and stem assembly comprising:
a body member including
a stem portion,
a left airfoil portion extending outwardly from a left side of the stem portion, and
a right airfoil portion extending outwardly from a right side of the stem portion;
one or more stacked left streamlined spacers extending vertically upwardly from a top of the left airfoil portion, each streamlined spacer of the one or more stacked left streamlined spacers having a left trailing edge;
one or more stacked right streamlined spacers extending vertically upwardly from a top of the right airfoil portion, each streamlined spacer of the one or more stacked right streamlined spacers having a right trailing edge;
a left top spacer including a left clamp portion and a left streamlined portion including a left side, a right side and a left top spacer trailing edge, the left top spacer being received on top of the one or more stacked left streamlined spacers, the left clamp portion extending generally outwardly from a left or right side of the left streamlined portion and including top and bottom opposing bolt bosses including aligned substantially vertical bolt bores extending through each of the top and bottom bosses with a left threaded bolt being received therethrough, the top and bottom opposing bosses being located directly behind the left top spacer trailing edge of the left streamlined portion;
a right top spacer including a right clamp portion and a right streamlined portion including a left side, a right side and a right top spacer trailing edge, the right top spacer being received on top of the one or more stacked right streamlined spacers, the right clamp portion extending generally outwardly from a left or right side of the right streamlined portion and including top and bottom opposing bolt bosses including aligned substantially vertical bolt bores extending through each of the top and bottom bosses with a right threaded bolt being received therethrough, the top and bottom opposing bosses being located directly behind the right top spacer trailing edge of the right streamlined portion; and
a left tubular extension and a right tubular extension, the left tubular extension being received in the left clamp portion and the right tubular extension being received in the right clamp portion.

2. The handlebar assembly of claim 1, wherein the stem portion defines a cavity, the cavity being at least 25 mm wide×20 mm deep×50 mm long.

3. The handlebar assembly of claim 2, wherein the cavity is configured to receive a front junction box of an electronic shifting system.

4. The handlebar assembly of claim 2, wherein the cavity includes an open side facing upwardly, and wherein the handlebar assembly further includes a stem cover, the stem cover being secured to the stem portion and covering at least a substantial portion of the cavity.

5. The handlebar assembly of claim 2, further including one or more stem height spacers, each stem height spacer including a steerer tube bore, a brake cable opening and a slot extending from the brake cable opening to an outer edge of the spacer.

6. The handlebar assembly of claim 2, further comprising:
a left elbow assembly, the left elbow assembly including a left elbow pad platform and a left elbow pad received on the left elbow platform, the left elbow platform having a first array of holes arranged thereon with at least two securing fasteners received through a pair of the holes of the first array of holes, extending through interiors of the one or more stacked left streamlined spacers and being threadably received in the body member thereby securing the left elbow platform to the remainder of the handlebar assembly, and wherein another hole of the second array of holes being located directly over the left threaded bolt of the left top spacer; and a right elbow assembly, the right elbow assembly including a right elbow pad platform and a right elbow pad received on the right elbow platform, the right elbow platform having a second array of holes arranged thereon with at least two securing fasteners received through a pair of the holes of the second array of holes, extending through interiors of the one or more stacked right streamlined spacers and being threadably received in the body member thereby securing the right elbow platform to the remainder of the handlebar assembly, and wherein another hole of the second array of holes being located directly over the right threaded bolt of the right top spacer.

7. The handlebar assembly of claim 1, wherein the body member is unitarily constructed and comprises a carbon fiber composite material.

8. The handlebar assembly of claim 1, further comprising:
a left elbow assembly, the left elbow rest assembly including a left elbow pad platform and a left elbow pad received on the left elbow platform, the left elbow platform having a first array of holes arranged thereon with at least two securing fasteners received through a pair of the holes of the first array of holes extending through interiors of the one or more stacked left streamlined spacers and being threadably received in the body member thereby securing the left elbow platform to the remainder of the handlebar assembly, each hole of the first array of holes of the left elbow pad platform having uniform spacing relative to the other holes of the first array of holes, and wherein another hole of the first array of holes being located directly over the left threaded bolt of the left top spacer; and
a right elbow assembly, the right elbow rest assembly including a right elbow pad platform and a right elbow pad received on the right elbow platform, the right elbow platform having a second array of holes arranged thereon with at least two securing fasteners received through a pair of the holes of the second array of holes extending through interiors of the one or more stacked right streamlined spacers and being threadably received in the body member thereby securing the right elbow platform to the remainder of the handlebar assembly, each hole of the second array of holes of the right elbow pad platform having uniform spacing relative to the other holes of the second array of holes, and wherein another hole of the second array of holes being located directly over the right threaded bolt of the right top spacer.

9. A handlebar and stem assembly comprising:
a body member including
a stem portion,
a left airfoil portion extending outwardly from a left side of the stem portion, and
a right airfoil portion extending outwardly from a right side of the stem portion;
one or more stacked left streamlined spacers extending vertically upwardly from a top of the left airfoil portion, each streamlined spacer of the one or more stacked left streamlined spacers having an aft edge, wherein the aft edge of each stacked left streamlined spacer of the one or more left streamlined spacers includes a vertically extending groove, the vertically extending groove being sized and configured to retain an electrical wire therein;
one or more stacked right streamlined spacers extending vertically upwardly from a top of the right airfoil portion, each streamlined spacer of the one or more stacked right streamlined spacers having an aft edge;
a left top spacer including a left clamp portion and a left streamlined portion including a left side, a right side and an aft side, the left top spacer being received on top of the one or more stacked left streamlined spacers, the left clamp portion extending generally outwardly from a left or right side of the left streamlined portion and including top and bottom opposing bolt bosses including aligned substantially vertical bolt bores extending through each of the top and bottom bosses with a left threaded bolt being received therethrough, the top and bottom opposing bosses being located directly behind the aft side of the left streamlined portion;
a right top spacer including a right clamp portion and a right streamlined portion including a left side, a right side and an aft side, the right top spacer being received on top of the one or more stacked right streamlined spacers, the right clamp portion extending generally outwardly from a left or right side of the right streamlined portion and including top and bottom opposing bolt bosses including aligned substantially vertical bolt bores extending through each of the top and bottom bosses with a right threaded bolt being received therethrough, the top and bottom opposing bosses being located directly behind the aft side of the right streamlined portion; and
a left tubular extension and a right tubular extension, the left tubular extension being received in the left clamp portion and the right tubular extension being received in the right clamp portion.

10. The handlebar assembly of claim 9, wherein the aft edge of each stacked right streamlined spacer of the one or more right streamlined spacers includes a vertically extending groove, the vertically extending groove being sized and configured to retain an electrical wire therein.

11. The handlebar assembly of claim 9, wherein the vertically extending groove of each stacked left streamlined spacer is about 3 mm in diameter.

12. The handlebar assembly of claim 9, wherein the stem portion defines a cavity, the cavity being at least 25 mm wide×20 mm deep×50 mm long.

13. The handlebar assembly of claim 12, further including one or more stem height spacers, each stem height spacer including a steerer tube bore, a brake cable opening and a slot extending from the brake cable opening to an outer edge of the spacer.

14. The handlebar assembly of claim 9, further including one or more stem height spacers, the one or more stem height spacers being stacked beneath the stem portion, each stem height spacer including a steerer tube bore, a brake cable opening and a slot extending from the brake cable opening to an outer edge of the spacer.

15. The handlebar assembly of claim 9, further comprising:
a left elbow assembly, the left elbow assembly including a left elbow pad platform and a left pad received on the left elbow platform, the left elbow platform having a first array of holes arranged thereon with at least two securing fasteners received through a pair of the holes of the first array of holes, extending through interiors of the one or more stacked left streamlined spacers and being threadably received in the body member thereby securing the left elbow platform to the remainder of the handlebar assembly, and wherein another hole of the second array of holes being located directly over the left threaded bolt of the left top spacer; and a right elbow assembly, the right elbow assembly including a right elbow pad platform and a right elbow pad received on the right elbow platform, the right elbow platform having a second array of holes arranged thereon with at least two securing fasteners received through a pair of the holes of the second array of holes, extending through interiors of the one or more stacked right streamlined spacers and being threadably received in the body member thereby securing the right elbow platform to the remainder of the handlebar assembly, and wherein another hole of the second array of holes being located directly over the right threaded bolt of the right top spacer.

16. A handlebar and stem assembly comprising:
a body member including
 (i) a stem portion with the stem portion defining a cavity, the cavity being at least 25 mm wide×20 mm deep×50 mm long wherein the cavity includes an open side facing upwardly, and wherein the handlebar assembly further includes a stem cover, the stem cover being secured to the stem portion and covering at least a substantial portion of the cavity,
 (ii) a left airfoil portion extending outwardly from a left side of the stem portion, and
 (iii) a right airfoil portion extending outwardly from a right side of the stem portion;
one or more stacked left streamlined spacers extending vertically upwardly from a top of the left airfoil portion, each streamlined spacer of the one or more stacked left streamlined spacers having an aft edge;
one or more stacked right streamlined spacers extending vertically upwardly from a top of the right airfoil portion, each streamlined spacer of the one or more stacked right streamlined spacers having an aft edge;
a left top spacer including a left clamp portion and a left streamlined portion including a left side, a right side and an aft side, the left top spacer being received on top of the one or more stacked left streamlined spacers, the left clamp portion extending generally outwardly from a left or right side of the left streamlined portion and including top and bottom opposing bolt bosses including aligned substantially vertical bolt bores extending through each of the top and bottom bosses with a left threaded bolt being received therethrough, the top and bottom opposing bosses being located directly behind the aft side of the left streamlined portion;
a right top spacer including a right clamp portion and a right streamlined portion including a left side, a right side and an aft side, the right top spacer being received on top of the one or more stacked right streamlined spacers, the right clamp portion extending generally outwardly from a left or right side of the right streamlined portion and including top and bottom opposing bolt bosses including aligned substantially vertical bolt bores extending through each of the top and bottom bosses with a right threaded bolt being received therethrough, the top and bottom opposing bosses being located directly behind the aft side of the right streamlined portion; and
a left tubular extension and a right tubular extension, the left tubular extension being received in the left clamp portion and the right tubular extension being received in the right clamp portion; and wherein there are at least two holes provided through the cover, the at least two holes being spaced 63 mm apart and configured to receive attaching bolts of a water bottle cage.

17. A handlebar and stem assembly comprising:
a body member including
 a stem portion,
 a left airfoil portion extending outwardly from a left side of the stem portion, and
 a right airfoil portion extending outwardly from a right side of the stem portion;
one or more stacked left streamlined spacers extending vertically upwardly from a top of the left airfoil portion, each streamlined spacer of the one or more stacked left streamlined spacers having an aft edge;
one or more stacked right streamlined spacers extending vertically upwardly from a top of the right airfoil portion, each streamlined spacer of the one or more stacked right streamlined spacers having an aft edge;
a left top spacer including a left clamp portion and a left streamlined portion including a left side, a right side and an aft side, the left top spacer being received on top of the one or more stacked left streamlined spacers, the left clamp portion extending generally outwardly from a left or right side of the left streamlined portion and including top and bottom opposing bolt bosses including aligned substantially vertical bolt bores extending through each of the top and bottom bosses with a left threaded bolt being received therethrough, the top and bottom opposing bosses being located directly behind the aft side of the left streamlined portion;
a right top spacer including a right clamp portion and a right streamlined portion including a left side, a right side and an aft side, the right top spacer being received on top of the one or more stacked right streamlined spacers, the right clamp portion extending generally outwardly from a left or right side of the right streamlined portion and including top and bottom opposing bolt bosses including aligned substantially vertical bolt bores extending through each of the top and bottom bosses with a right threaded bolt being received therethrough, the top and bottom opposing bosses being located directly behind the aft side of the right streamlined portion;
a left tubular extension and a right tubular extension, the left tubular extension being received in the left clamp portion and the right tubular extension being received in the right clamp portion; and
one or more stem height spacers, each stem height spacer including a steerer tube bore, a brake cable opening and a slot extending from the brake cable opening to an outer edge of the spacer.

18. The handlebar assembly of claim 17, wherein the slot extends through the steerer tube bore to a rear edge of the spacer.

19. A handlebar and stem assembly comprising:
a body member including
 a stem portion, the stem portion defining a cavity, the cavity being at least 25 mm wide×20 mm deep×50 mm long
 a left airfoil portion extending outwardly from a left side of the stem portion, and
 a right airfoil portion extending outwardly from a right side of the stem portion;

one or more stacked left streamlined spacers extending vertically upwardly from a top of the left airfoil portion, each streamlined spacer of the one or more stacked left streamlined spacers having an aft edge, the aft edge of each stacked left streamlined spacer of the one or more left streamlined spacers includes a vertically extending groove, the vertically extending groove being sized and configured to retain an electrical wire therein;

one or more stacked right streamlined spacers extending vertically upwardly from a top of the right airfoil portion, each streamlined spacer of the one or more stacked right streamlined spacers having an aft edge, the aft edge of each stacked right streamlined spacer of the one or more right streamlined spacers includes a vertically extending groove, the vertically extending groove being sized and configured to retain an electrical wire therein;

a left top spacer including a left clamp portion and a left streamlined portion including a left side, a right side and an aft side, the left top spacer being received on top of the one or more stacked left streamlined spacers, the left clamp portion extending generally outwardly from a left or right side of the left streamlined portion and including top and bottom opposing bolt bosses including aligned substantially vertical bolt bores extending through each of the top and bottom bosses with a left threaded bolt being received therethrough, the top and bottom opposing bosses being located directly behind the aft side of the left streamlined portion;

a right top spacer including a right clamp portion and a right streamlined portion including a left side, a right side and an aft side, the right top spacer being received on top of the one or more stacked right streamlined spacers, the right clamp portion extending generally outwardly from a left or right side of the right streamlined portion and including top and bottom opposing bolt bosses including aligned substantially vertical bolt bores extending through each of the top and bottom bosses with a right threaded bolt being received therethrough, the top and bottom opposing bosses being located directly behind the aft side of the right streamlined portion;

left and right elbow rest assemblies, the left and right elbow rest assemblies including respective left and right elbow pad platforms and respective left and right elbow pads received on the respective left and right elbow platforms, each elbow platform having an array of holes arranged thereon with at least two securing fasteners received through a pair of the holes of the array thereby securing the elbow platform to the remainder of the handlebar assembly, another hole of the array being located directly over the a respective left or right threaded bolt of the respective left or right top spacer;

a left tubular extension and a right tubular extension, the left tubular extension being received in the left clamp portion and the right tubular extension being received in the right clamp portion; and one or more stem height spacers, each stem height spacer including a steerer tube bore, a brake cable opening and a slot extending from the brake cable opening to an outer edge of the spacer.

20. The handlebar assembly of claim 19, wherein the body member is unitarily constructed and comprises a carbon fiber composite material.

\* \* \* \* \*